June 7, 1955     R. G. DE BUDA     2,710,380
WINDING TRANSPOSITIONS FOR ELECTRICAL APPARATUS
Filed June 11, 1953     2 Sheets-Sheet 1
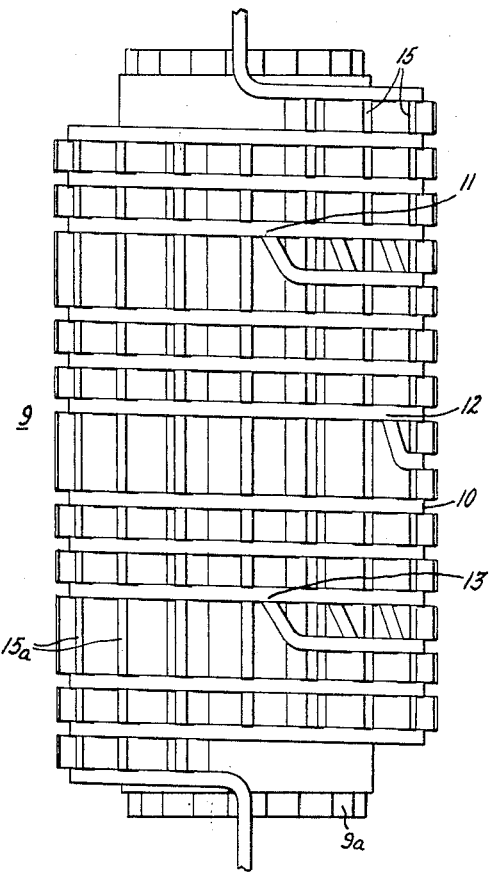
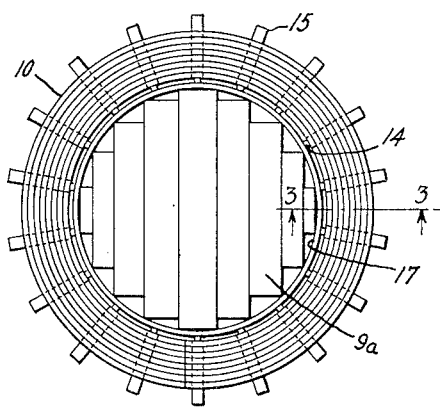
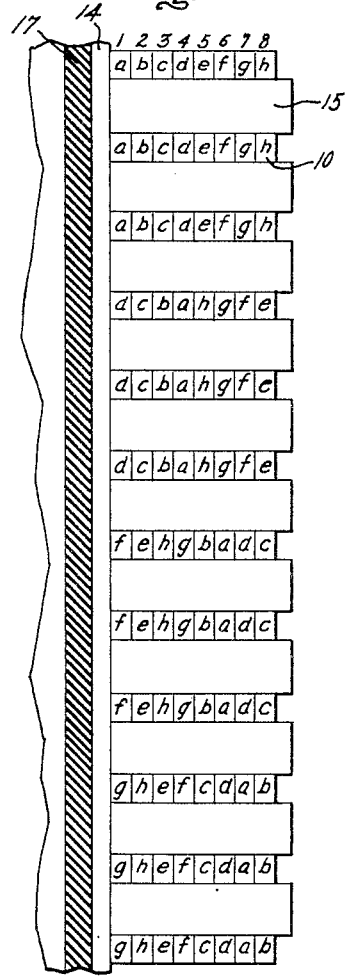
Inventor:
Rudolf G. de Buda,
by Gilbert P. Tarleton
His Attorney.

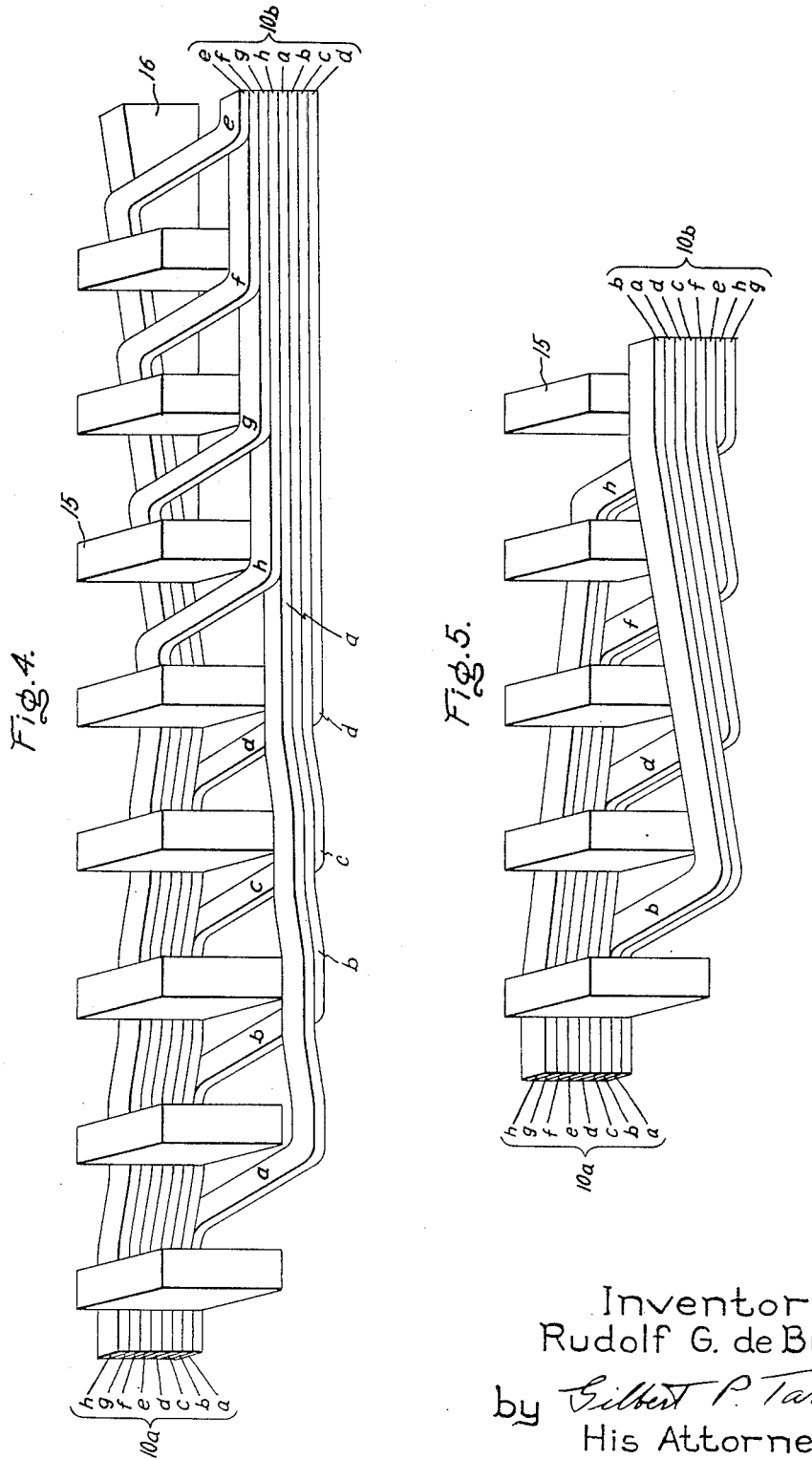

United States Patent Office 2,710,380
Patented June 7, 1955

2,710,380

WINDING TRANSPOSITIONS FOR ELECTRICAL APPARATUS

Rudolf G. de Buda, Toronto, Ontario, Canada, assignor to Canadian General Electric Company, Limited, Toronto, Ontario, Canada, a corporation of Canada Application June 11, 1953, Serial No. 361,011

5 Claims. (Cl. 336—187)

My invention relates to windings for electrical apparatus and particularly to windings which are laminated or subdivided into a plurality of strands connected in parallel for the purpose of reducing eddy current losses.

In alternating current theory, it is known that as the frequency increases or the size of the conductor increases, there is a tendency for the current in a conductor to concentrate near the surface. This is usually referred to as "skin effect." Analysis of the current distribution in a conductor shows that it can be resolved into two superposed distributions—one conventional like the direct current distribution, and the other circulating within the conductor without getting out of it. This latter is known sometimes as eddy current which does not contribute to the normal current flow and consequently results in a power loss known as eddy current loss.

Heavy current apparatus requires larger conductors than low rated apparatus and ordinarily uses rectangular conductors. As a result, the eddy current losses increase since they vary as the square of the conductor thickness. The thickness is taken as that dimension of the conductor cross-section which is perpendicular to the direction of the leakage flux which exists in electromagnetic apparatus. These high eddy current losses can be reduced by subdividing the conductor into a plurality of insulated strands, connected in parallel. Each strand in a stranded conductor wound about a magnetic core material is subject to the above-mentioned leakage flux. The density of this leakage flux varies in accordance with the distance of the strand from the inside radius of the winding. Consequently, voltages induced in the stranded conductor by the leakage flux are dependent on the position of the strand in the winding.

To compensate for this condition, it is the practice to transpose the strands so that each strand occupies a number of different positions. If the strands are not transposed, or if only a few transpositions are made, the flux linkages are not the same for each strand and different voltages are induced in each strand so that there will be a circulating current from one strand through the parallel connections to another strand. The different strands then do not carry equal currents and in addition to the equivalent D.-C. loss and the eddy loss E within each strand, there results another loss which is known as circulating loss C. By transposing the strands so that the leakage flux linkages of each strand are approximately the same and the length of each strand is the same, then each strand carries approximately the same current. Current distribution conditions are then the same as if all the strands are in series and the eddy loss E may be calculated using the thickness of one strand only instead of the total thickness of the conductor.

In order to obtain an exactly equal division of the current among the strands of the conductor, and consequently an equal distribution of flux linkages, it is necessary, theoretically, to transpose the conductor as often as there are strands. Taking a rectangular conductor, the transpositions should be arranged so that each strand will occupy every position between the two edges of the conductor. However, this would require a multitude of transpositions for a conductor which is of sufficient thickness to divide into a plurality of strands. Various systems of transpositions have been proposed in the past including a so-called Hobart transposition system which transposes each strand into every position as suggested above for ideal conditions. For example, for a twenty-strand conductor, each strand occupies twenty different positions. This requires twenty transpositions and in many coils, it is impractical to make so many transpositions. Therefore, though the Hobart transposition system has no circulating loss, it has found only a limited use.

A more practical transposition system from the standpoint of economy and convenience in winding has been used extensively in transformer windings. This system provides only three individual transpositions per winding regardless of the number of strands. These transpositions are of two kinds, the first and last usually being referred to as special transpositions and the intermediate one as a standard transposition. The system itself is called a standard transposition system. It is considerably more economical and less complicated to wind than a Hobart transposition system but does not reduce the circulating losses to the same degree. A more detailed description of the standard transposition system is given later in the specification.

I have discovered a still further type of transposition system which is comparable in mechanical simplicity to a standard transposition system and at the same time reduces the circulating losses to a fraction of the circulating losses in a winding using a standard transposition system.

It is accordingly the object of my invention to provide a winding for an electrical apparatus which is subdivided into a plurality of strands and transposed with a minimum of complexity in such a manner that an approximately equal distribution of flux linkages is obtained so that the circulating losses are reduced substantially below those existing in present day economically transposed windings.

The invention will be described in connection with a winding of the type used on transformers having a concentric construction. However, my system of transpositions may be used in other types of transformer or reactor coils, or for other types of electrical apparatus where a multi-strand conductor is subject to a large leakage field. The only condition is that the leakage flux density must be approximately a linear function of the position of the strands. In a helical coil, this condition is obviously met if the positions of the strands are numbered from the center out. However, I do not intend to limit my invention to helical coils only, as it can be used for any multi-strand conductor where a strand position can be defined in accordance with the above stated condition. In all these cases an approximately equal distribution of flux linkages can be obtained by transposing the conductor strands in accordance with my invention.

My invention will be better understood by referring to the accompanying drawings in cooperation with the following description. Fig. 1 of the drawing shows a helical winding such as may be used in a transformer, the conductor forming the winding comprising a plurality of transposed parallel connected strands. Fig. 2 is a plan view of the winding in Fig. 1 except that the outgoing lead shown in Fig. 1 has been removed. Fig. 3 is a view on a longitudinal plane taken radially through the transformer winding, e. g., along line 3—3 of Fig. 2, and is on a larger scale than Fig. 1. Fig. 4 is an isometric view of a portion of the winding in Fig. 1, developed in such a manner that the transposition of the winding from one turn to another is illustrated for each strand of the conductor. Fig. 5 is a view similar to Fig. 4 illustrating a different transposition. The curvature of the winding cylinder is neglected in Figs. 4 and 5.

As indicated previously, the common practice today is to transpose a transformer winding three times using a standard transposition system. Using this system the circulating loss may be evaluated approximately by the following formula:

$$C = E \times \left(\frac{m}{13}\right)^2$$

where $C$=circulating loss, $E$=total eddy loss (due to eddy currents within each strand), $m$=number of radial strands. It can be shown mathematically that the transposition system of my invention, also using three separate transpositions, reduces the circulating loss so that it approximates $$C = E \times \left(\frac{m}{50}\right)^2$$

The circulating loss of my transposition system is therefore approximately equal to one-sixteenth of the circulating loss of the standard transposition system regardless of the number of strands "$m$." For a small "$m$" the circulating loss of the standard system is small and may be neglected. However for "$m$" equal to twelve or more as is usually the case in low voltage windings of high kva. units, the circulating loss of the standard system is so high that it cannot be neglected. My invention, therefore, is particularly applicable when the number of strands "$m$" is equal to or larger than twelve. For purposes of explanation, however, I shall refer to a winding having eight strands since this is more readily illustrated.

Referring to the drawings in Fig. 1, I have shown a helical winding commonly used in transformer constructions having a plurality of turns 10 wound in a helix 9 about a core member 9a. I have illustrated a helix of twelve turns. Each of the winding turns 10 comprises eight separately insulated parallel connected strands lettered "a" to "h" which are transposed at three points 11, 12 and 13 distributed at substantially equal intervals along the winding. The strands "a" to "h" are arranged side by side in a flat layer at right angles to the axis of the helix 9. A winding cylinder 17 surrounds the core member. The turns 10 are spaced from the cylinder 17 by means of a plurality of radially extending key spacers 14 positioned between the cylinder 17 and the winding turns 10. The turns are supported in substantially horizontal planes by spacers 15 which also extend radially from the winding cylinder 17. In Fig. 3 I have illustrated all the spacers 15 as of equal size between adjacent winding turns. However, as may be seen in Fig. 1, the spacers 15a located at a point of transposition are of necessity larger. Before transposing, strand "a" is shown as being adjacent the winding cylinder, and strand "h" is the farthest from the cylinder in Figs. 3, 4 and 5.

I have shown in Fig. 3 a radial section cut through the winding illustrating the positions 1 to 8 relative to the winding cylinder 17, into which the strands "a" to "h" may be moved by means of a transposition. By reference to Figs. 4 and 5 the various positions assumed by the strands "a" to "h" may be traced out for the different transpositions used.

The following arrangement of numbers commonly known as a substitution indicates the various positions assumed by each of the eight strands in an eight-strand conductor when transpositions of the type previously mentioned as old and known as special and standard are used.

A standard transposition—$S_t = \begin{pmatrix} 1 & 2 & 3 & 4 & 5 & 6 & 7 & 8 \\ 8 & 7 & 6 & 5 & 4 & 3 & 2 & 1 \end{pmatrix}$
($m$=8)

A special transposition—$S_p = \begin{pmatrix} 1 & 2 & 3 & 4 & 5 & 6 & 7 & 8 \\ 5 & 6 & 7 & 8 & 1 & 2 & 3 & 4 \end{pmatrix}$
($m$=8)

The first line in each of the above symbols represents the relative positions occupied by the eight strands "a" to "h" before the transposition and the second line indicates the positions occupied by the same strands after the transposition. The numbers representing the two positions of the same strand before and after the transposition are arranged in the same vertical column. In other words a standard transposition for "$m$" equal to eight transposes one of the strands from position 1 to position 8, another strand from position 2 into position 7 and so on as indicated. Similarly, a special transposition for "$m$" equal to eight transposes one of the strands from position 1 to position 5, another strand from position 2 to position 6 and so on.

As discussed previously, it has been quite common practice to use these two types of transpositions in a standard transposition system on a transformer winding. This standard system utilizes a special transposition performed at a point on the winding one quarter of the distance along the conductor, followed by a standard transposition at the midpoint in the conductor and then another special transposition at the three-quarter point on the winding. In an eight-strand conductor, the following arrangement of numbers indicates the positions through which each strand "a" to "h" moves in a standard transposition system—

$$\begin{matrix} & \begin{pmatrix} 1 & 2 & 3 & 4 & 5 & 6 & 7 & 8 \\ S_p & 5 & 6 & 7 & 8 & 1 & 2 & 3 & 4 \\ S_t & 4 & 3 & 2 & 1 & 8 & 7 & 6 & 5 \\ S_p & 8 & 7 & 6 & 5 & 4 & 3 & 2 & 1 \end{pmatrix} \end{matrix}$$

In accordance with the above explanation of the new positions assumed by the various strands after a transposition, strand "a" moves from position 1 into position 5, after the first special transposition, then into position 4 and finally into position 8. Similarly strands "d," "e," and "h" move through the same four positions namely 1, 4, 5 and 8 although in different sequences.

By mathematical calculation I have found that I can reduce the circulating loss to the extent indicated above by means of a different series of three transpositions. I have found that all strands must be transposed through three succeeding transpositions so that each strand occupies each of the following four positions in any sequence for one quarter of the total length of the winding:

$$(1+x), \left(\frac{m}{2}-x\right), \left(\frac{3m}{4}-x\right), \left(\frac{3m}{4}+1+x\right)$$

where "$x$" is consecutively each integer between 0 and $$\frac{m}{4}-1 \left(0 \leqq x \leqq \frac{m}{4}-1\right)$$

and constant for a given strand through all four positions, and "$m$" is equal to the number of strands and a multiple of four. It is necessary to evaluate "$x$" in these expressions for each integer between 0 and $$\frac{m}{4}-1$$

in order to locate the position of each strand after a transposition, taking care that "$x$" remains constant for any one strand. For example in an eight-strand conductor ($m$=8) as shown in Fig. 3, the value of "$x$" is an integer between 0 and 1. Hence both $x=0$ and $x=1$ must be used in evaluating the above expressions. For $x=0$ these expressions become 1, 4, 6 and 7 and for $x=1$ they are 2, 3, 5, 8. Consequently, in accordance with my invention, strands $a, d, f, g$, occupy the positions 1, 4, 6, 7 in Fig. 3 interchange with each other throughout the length of the winding, each strand occupying a different one of the positions 1, 4, 6, 7 after each transposition and strands $b, c, e, h$, occupying positions 2, 3, 5, 8 interchange with each other, each strand occupying a different one of the conditions 2, 3, 5, 8 after each transposition. It will be explained later how the above formula representing the four positions through which each strand moves can be extended for "$m$" not a multiple of four. The order in which the strands occupy the above positions is of no consequence. Any sequence will satisfy the requirements of my invention.

In order to clarify the mathematical formulae presented above, I have illustrated in Figs. 4 and 5 two of the types of transpositions which may be used in order to position the strands as required through three successive transpositions. Other types of transpositions may of course be used in order to locate the strands in accordance with my invention.

Fig. 4 is a development of part of one turn 10 of the winding showing the transposition of the eight strands "a" to "h" from an upper turn 10a to a lower turn 10b immediately below turn 10a. A part of the transposition from an upper turn to a lower turn may be seen also in Fig. 1. It will be observed that the complete transposition of the eight strands takes place within a distance of eight of the spacers 15. I have called this a "filler piece" tranposition or an "F" type transposition. For eight strands this transposition is described by the substitution $$F = \begin{pmatrix} 1 & 2 & 3 & 4 & 5 & 6 & 7 & 8 \\ 4 & 3 & 2 & 1 & 8 & 7 & 6 & 5 \end{pmatrix}$$

which means that one of the eight strands (strand "a" in Fig. 4) moves from position 1 to position 4, strand "b" in Fig. 4 moves from position 2 to position 3 and so on. The movement of the strands from the upper turn 10a to the lower turn 10b during the F transposition may be followed in Fig. 4. Since strand "h," "g," "f," "e" are reversed during the transposition so that strand "e" replaces strand "h" at the top of the stack of strands, a wedge or filler piece 16 may be used to support them in the upper or old turn 10a at the point of transposition to the lower or new turn 10b.

Fig. 5 is a development somewhat similar to Fig. 4 illustrating a different type of transposition which I term a quarter transposition or a Q type transposition. The strands are lettered with the same reference characters as in Fig. 4. The Q transposition is similar to a standard transposition except that one quarter of the total strands are moved as a unit from turn 10a to 10b instead of one strand at a time. Consequently, for an eight-strand conductor as illustrated in Fig. 5, the strands are transposed from one turn to the next in pairs. Thus the quarter transposition is described by $$Q = \begin{pmatrix} 1 & 2 & 3 & 4 & 5 & 6 & 7 & 8 \\ 7 & 8 & 5 & 6 & 3 & 4 & 1 & 2 \end{pmatrix}$$

and strand "a" in Fig. 5 moves from position 1 to position 7, strand "b" moves from position 2 to position 8 and so on. This type of transposition is wound between five of the spacers 15, the first quarter of the number of strands being transposed between the first and second spacers, the second quarter between the second and third spacers and so on.

Since in a quarter transposition the strands are transposed in four groups of ¼ m strands to each group it is desirable but not essential that the total number of strands be a multiple of four, so that the four groups each have an equal number of strands.

For a larger number of strands ($m$) the F and Q transpositions may be formulated from the generalized formulae as follows, where $n = \frac{1}{4} m$:

$$F = \begin{pmatrix} 1, & 2, & \ldots & 2n, & 2n+1, & 2n+2, & \ldots & 4n \\ 2n, & 2n-1, & \ldots & 1, & 4n, & 4n-1, & \ldots & 2n+1 \end{pmatrix}$$

$$Q = \begin{pmatrix} 1, & 2 & \ldots & n, & n+1 & \ldots & 2n, & 2n+1 & \ldots & 3n, & 3n+1, & 3n+2 & \ldots & 4n \\ 3n+1, & 3n+2 & \ldots & 4n, & 2n+1 & \ldots & 3n, & n+1 & \ldots & 2n, & 1, & 2, & \ldots & n \end{pmatrix}$$

These yield the two formulae previously given for F and Q when "$m$" equals eight by inserting $n = 2$.

The transposition system of my invention may be accomplished by using a combination of both the F and Q type transposition. As discussed above, I divide the turns 10 of the winding into four equal parts at points 11, 12 and 13 and perform transpositions at these points which will position the strands in accordance with my invention. By using an F transposition followed by a Q transposition and another F transposition or by using a Q-F-Q series of transpositions, it will be found that each strand occupies each of the four positions $$(1+x), \left(\frac{m}{2}-x\right), \left(\frac{3m}{4}-x\right), \left(\frac{3m}{4}+1+x\right)$$

for one quarter of the length of the winding. By means of this system of transposition, I am able to reduce the circulating losses to approximately $\frac{1}{16}$ of those present when a standard transposition system is used.

The conditions given for my transposition system also apply when the number of strands is not a multiple of four. The previous restriction that the number of strands be a multiple of four was laid down in order to simplify the winding design. In instances where the number of strands "$m$" is not a multiple of four, the evaluation of the expressions designating strand positions, namely $$(1+x), \left(\frac{m}{2}-x\right), \left(\frac{3m}{4}-x\right), \left(\frac{3m}{4}+1+x\right)$$

where $x$ is any integer between 0 and $$\frac{m}{4}\left(0 \leq x < \frac{m}{4}\right)$$

will result in some of the expressions being a fraction of a whole number. In such an event the expression should be given the value of the next higher or next lower integer and the strands transposed accordingly. The choice between the higher or lower integer will depend on the positioning of the other strands upon transposition, that is two strands must not be given the same position in the same part of the winding.

In Fig. 3, I have utilized an F-Q-F system of transposition, the successive positions of the eight strands being shown for each turn 10 of the winding. By evaluating the formulae used to define my transposition system, it will be found that for "$m$" equal to eight, the strand "a" moves from position 1 to positions 4, 6, and 7, not necessarily in that sequence, and strand "b" moves from position 2 to positions 3, 5, 8. These transpositions correspond with the actual positions taken up by the strands when an F-Q-F transposition system is used to transpose the strands, the definitions for F and Q type transpositions being given above. Likewise the other strands "c" to "h" take up their new positions after each transposition in the F-Q-F system in accordance with my invention.

It will be apparent that I have provided a simplified transposition system for a stranded conductor electrical winding, which ensures a reduction in circulating losses as compared with present day transposition systems requiring only a limited number of transpositions.

While there has been shown and described particular embodiments of the invention, it will be obvious to those skilled in the art that changes and modifications may be made without departing from the invention, and that it is intended by the appended claims to cover all such changes and modifications as fall within the true spirit and scope of the invention.

The embodiments of the invention in which an exclusive property or privilege is claimed are defined as follows:

1. An electrical apparatus having a winding comprising a conductor subdivided into a plurality of insulated strands wherein an approximately equal distribution of flux linkages is obtained by transposing the strands through three succeeding substantially equally spaced transpositions so that each strand occupies, for substantially one quarter of the total length of the winding, each of the following four positions in any sequence:

$$(1+x), \left(\frac{m}{2}-x\right), \left(\frac{3m}{4}-x\right), \left(\frac{3m}{4}+1+x\right)$$

where "x" is consecutively each integer between 0 and $$\frac{m}{4}-1$$

and constant for a given strand through all four positions and "m" is equal to the number of strands and is a multiple of four.

2. An electrical apparatus having a winding comprising a conductor subdivided into a plurality of insulated strands wherein an approximately equal distribution of flux linkages is obtained by transposing the strands through three succeeding substantially equally spaced transpositions so that each strand occupies, for substantially one quarter of the total length of the winding, each of the following four positions in any sequence:

$$(1+x), \left(\frac{m}{2}-x\right), \left(\frac{3m}{4}-x\right), \left(\frac{3m}{4}+1+x\right)$$

where "x" is consecutively each integer between 0 and $$\frac{m}{4}$$

and constant for a given strand through all four positions and "m" is equal to the number of strands, and is not a multiple of 4 and where for non-integral values of $$(1+x), \left(\frac{m}{2}-x\right), \left(\frac{3m}{4}-x\right), \left(\frac{3m}{4}+1+x\right)$$

the next higher or lower integer is used, the choice of which depends on the transposed positions of the remaining strands assumed in accordance with the integral values of $$(1+x), \left(\frac{m}{2}-x\right), \left(\frac{3m}{4}-x\right), \left(\frac{3m}{4}+1+x\right)$$

whereby only one strand occupies any given position in the same portion of the winding.

3. A transformer having a conductor subdivided into a plurality of insulated strands, and wound into a multi-turn helix about a core member, wherein an approximately equal distribution of flux linkages is obtained by transposing the strands through three succeeding substantially equally spaced transpositions so that each strand occupies, for substantially one quarter of the total length of the helix, each of the following four positions in any sequence:

$$(1+x), \left(\frac{m}{2}-x\right), \left(\frac{3m}{4}-x\right), \left(\frac{3m}{4}+1+x\right)$$

where "x" is consecutively each integer between 0 and $$\frac{m}{4}-1$$

and constant for a given strand through all four positions and "m" is equal to the number of strands and is a multiple of four.

4. In an electrical apparatus having a winding comprising a conductor subdivided into a plurality of insulated strands "m" in number, said strands being placed in successive adjacent positions which may be represented by a series of successive integers from 1 through "m," the improvement being characterized by said strands being transposed through three succeeding transpositions in such a manner that for a given group of four strands whose respective initial positions are represented by the four integers derived from the expression:

$$(1+x), \left(\frac{m}{2}-x\right), \left(\frac{3m}{4}-x\right), \text{ and } \left(\frac{3m}{4}+1+x\right)$$

where "x" for one group of four strands is one of the integers between 0 and $$\left(\frac{m}{4}-1\right)$$

and "x" for another group of four strands is another of the integers between 0 and $$\left(\frac{m}{4}-1\right)$$

"x" being constant for a given strand through all four positions; and "m" is a multiple of four, each of the four strands in said given group occupy for substantially one quarter of the total length of the winding each of the four positions represented by the integers derived from said expression, whereby approximately equal flux distribution of flux linkages is obtained.

5. An electrical apparatus having a winding comprising a conductor subdivided into a plurality of insulated strands wherein an approximately equal distribution of flux linkages is obtained by transposing the strands through three succeeding transpositions so that each strand occupies, for substantially one quarter of the total length of the winding, each of the following four positions in any sequence:

$$(1+x), \left(\frac{m}{2}-x\right), \left(\frac{3m}{4}-x\right), \left(\frac{3m}{4}+1+x\right)$$

where "x" is consecutively each integer between 0 and $$\frac{m}{4}$$

and constant for a given strand through all four positions and "m" is equal to the number of strands, "x" being less than $$\frac{m}{4}$$

when "m" is a multiple of four.

References Cited in the file of this patent
UNITED STATES PATENTS

| | | |
|---|---|---|
| 1,629,462 | Palueff | May 17, 1927 |
| 2,310,684 | Farry | Feb. 9, 1943 |